Nov. 23, 1937.  P. H. TRAVIS  2,099,912
VEHICLE PILLAR STRUCTURE
Filed April 29, 1935
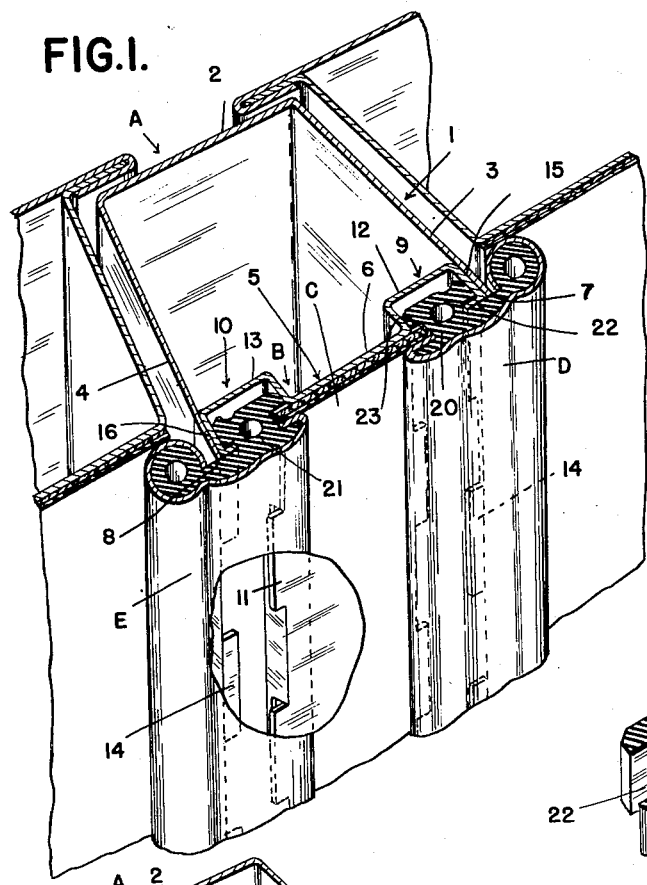
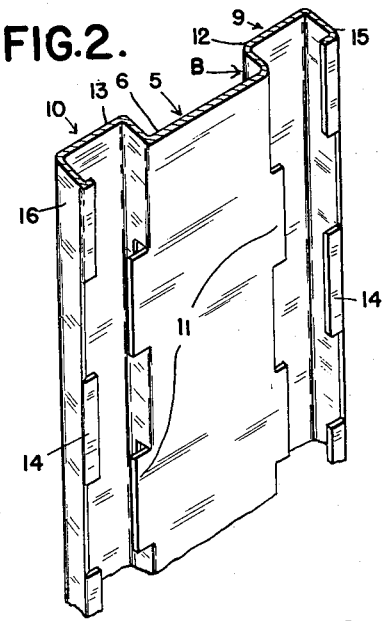
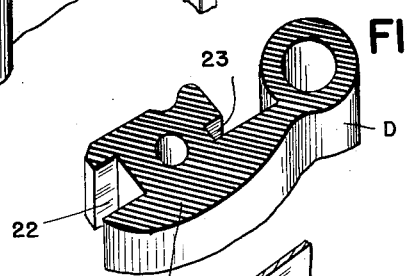
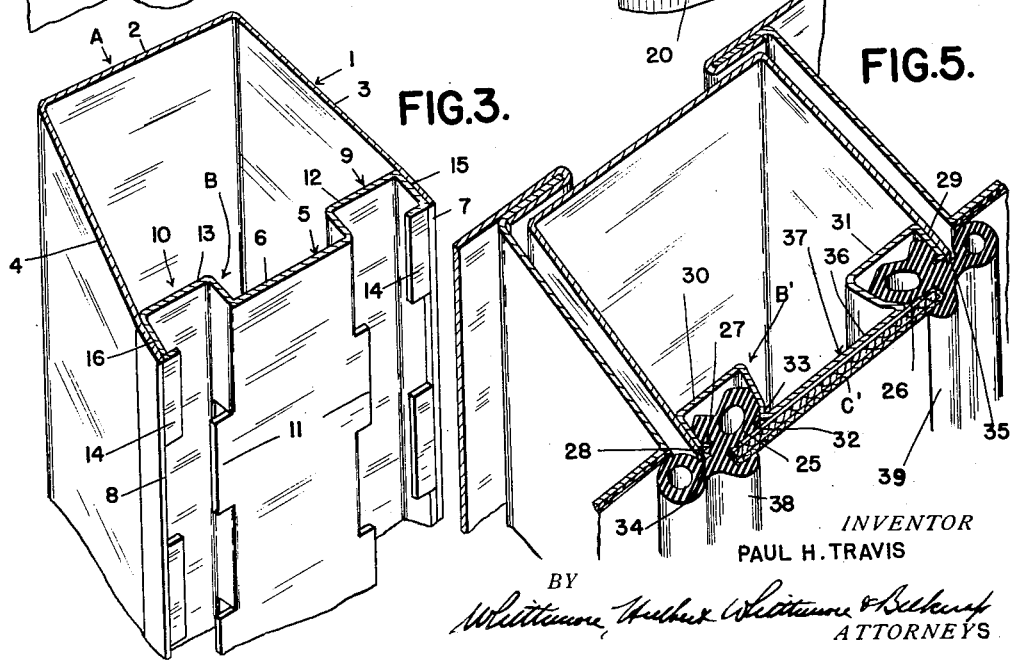
INVENTOR
PAUL H. TRAVIS
BY
*Whittemore, Hulbert, Whittemore & Belknap*
ATTORNEYS Patented Nov. 23, 1937

2,099,912

UNITED STATES PATENT OFFICE 2,099,912

VEHICLE PILLAR STRUCTURE

Paul H. Travis, Detroit, Mich.

Application April 29, 1935, Serial No. 18,940

7 Claims. (Cl. 296—44)

This invention relates generally to vehicle body constructions and refers more particularly to an all-metal pillar and weather strip assembly.

One of the essential objects of the invention is to provide an all-metal pillar having a reinforcement that not only braces and stiffens the pillar, but also forms a seat for a suitable trim panel and has cooperating means for receiving and holding one or more weather strips.

Another object is to provide a pillar of the type mentioned wherein the reinforcement may be readily formed with the seat and cooperating means aforesaid, and may be readily united with the pillar.

Other objects, advantages and novel details of construction of this invention will be made more apparent as this description proceeds, especially when considered in connection with the accompanying drawing, wherein:

Figure 1 is a fragmentary perspective view of a vehicle body construction embodying my invention;

Figure 2 is a detail perspective view of the pillar reinforcement;

Figure 3 is a perspective view of the vehicle body construction illustrated in Figure 1 before the trim panel and weather strips have been applied;

Figure 4 is a detail perspective view of one of the weather strips; and

Figure 5 is a fragmentary perspective view of a slight modification.

Referring now to the drawing, A is a pillar embodying my invention having a channel section 1 and a pressed metal reinforcement B. As shown, the reinforcement B closes the channel section 1 and cooperates with the base 2 and sides 3 and 4, respectively, of said section to form a box-like structure. Preferably, the reinforcement B has a channel-shaped portion 5 opening inwardly with the base 6 of said channel portion substantially in line with the edges 7 and 8 of the channel section 1, and is provided at opposite sides of said channel-shaped portion 5 with outwardly opening channels 9 and 10, respectively, that are welded to opposite sides 3 and 4 of the channel section. Preferably, tongues 11 are struck out from opposite sides of the inwardly opening channel-shaped portion 5 of the reinforcement and extend into the outwardly opening channels 9 and 10 in substantially parallel relation to the bases 12 and 13, respectively, thereof, while other tongues 14 are turned inwardly from the outer sides 15 and 16, respectively, of the outwardly opening channels 9 and 10 so as to extend substantially parallel to the bases 12 and 13 of said channels. By referring to Figure 1, it will be noted that the tongues 11 and 14 are alternately arranged and are substantially in line with the base 6 of the inwardly opening channel 5.

In use, a trim panel such as C may be mounted on the base 6 of the inwardly opening channel portion 5 of the reinforcement and may be held in position thereon by suitable weather strips D and E having bodies 20 and 21, respectively, anchored within the outwardly opening channels 9 and 10 of the reinforcement. Preferably, these weather strips D and E correspond to those set forth in my companion application filed April 29, 1935, bearing Serial No. 18,939, now Patent No. 2,051,757 and the body portions 20 and 21, respectively, thereof are provided with grooves 22 and 23, respectively, for the reception of the tongues 11 and 14, respectively. By referring to Figure 1, it will be noted that the groove 23 is relatively shallow and receives only the tongues 14, while the groove 22 is deeper and not only receives the tongues 11, but also the adjacent edge portions of the trim panel C. Thus, separate fastening elements such as nails, screws and the like for the weather strips D and E and trim panel C have been dispensed with entirely so that the parts may be assembled in less time and for less money than heretofore.

In Figure 5, I have illustrated another modification in which the bodies 25 and 26, respectively, are provided with grooves 27 for the reception of tongues 28 extending inwardly from the outer sides 29 of the channels 30 and 31 and are provided with beveled portions 32 for engagement with the undersides of overhanging portions 33 of the reinforcement B¹. Preferably, the tongues 28 are substantially in line with the inner edges 34 and 35, respectively, of the pillar, while the overhanging portions 33 are offset relative thereto and are at the base 36 of the channel portion 37 of said reinforcement which forms a seat for the trim panel C¹. In this construction, the outer faces 38 and 39, respectively, of the bodies 25 and 26 are preferably narrower than the body portions 20 and 21 illustrated in Figures 1 and 4.

What I claim as my invention is:

1. In combination, a pillar having a portion forming a seat for a trim panel, and provided upon opposite sides of said portion with outwardly opening channels, opposite sides of each of said channels having inturned tongues, weather strips in said channels and held against displacement by said tongues, and a trim panel on said seat and positively held against displacement by portions of said weather strips.

2. A pillar having a channel section, and a reinforcement for said section closing the channel thereof and cooperating with the base and sides of said channel section to form a box-like structure, said reinforcement having an inwardly opening channel-shaped portion and outwardly opening channels upon opposite sides of said inwardly opening channel-shaped portion, the base of the inwardly opening channel-shaped portion constituting a seat for a trim panel, said outwardly opening channels being adapted to receive portions of weather strips, opposite sides of said outwardly opening channels having staggeredly arranged tongues for holding the portions aforesaid of said weather strips against displacement.

3. A pillar having a channel-shaped portion, a strip-like reinforcement closing said channel-shaped portion and forming therewith a substantially box-like structure, said reinforcement having a longitudinally extending channel-shaped portion opening rearwardly toward the base of the channel portion of the pillar, and provided at opposite sides of said channel-shaped portion with longitudinally extending outwardly opening channel-shaped portions, the base of the first mentioned channel-shaped portion of said strip-like reinforcement forming a seat for a trim panel for the pillar, the outer sides of said last mentioned channel-shaped portions being secured directly to the side walls of the channel portion of the pillar, and tongues projecting inwardly from opposite sides of each of the last mentioned channel-shaped portions for holding a weatherstrip in said last mentioned channel-shaped portions adjacent to the trim panel aforesaid.

4. In combination, a pillar having a portion forming a seat for a trim panel and provided upon opposite sides of said portion with outwardly opening channels, opposite sides of each of said channels having inturned tongues, a trim panel on said seat portion of the pillar and overhanging adjacent walls of said channels, and weatherstrips held in said channels by said tongues and having portions overlapping the overhanging portions of said trim panel and positively holding said trim panel against displacement.

5. A pillar having a channel section and a strip reinforcement for said section having laterally spaced outwardly opening longitudinally extending channels for receiving portions of weather-strips, the outer side walls of said channels being rigidly secured to the side walls of said channel section, opposite side walls of each of said channels being provided at spaced points longitudinally thereof with inturned projections for holding said weather strip portions against displacement from said channels.

6. A pillar having a channel-shaped portion, a strip-like reinforcement closing said channel-shaped portion and forming therewith a substantially box-like structure, said reinforcement having a longitudinally extending portion substantially parallel to the base of the channel portion of the pillar and provided at opposite sides of said longitudinally extending portion with longitudinally extending outwardly opening channel-shaped portions, the longitudinally extending portion of said strip-like reinforcement forming a seat for a trim panel for the pillar, the outer sides of the channel-shaped portions of the strip-like reinforcement being secured directly to the side walls of the channel portion of the pillar, and tongues projecting inwardly from opposite sides of each of the channel-shaped portions of said strip-like reinforcement at spaced points longitudinally thereof for holding a weatherstrip in the channel-shaped portions of the strip-like reinforcement adjacent to the trim panel aforesaid.

7. In combination, a pillar having a portion forming a seat for a trim panel and provided at one side of said portion with an outwardly opening channel, opposite sides of said channel being provided at spaced points longitudinally thereof with inturned tongues, a trim panel on said seat portion of the pillar and overhanging the adjacent wall of said channel, and a weatherstrip held in said channel by said tongues and having a retaining portion overlapping the overhanging portion of said trim panel.

PAUL H. TRAVIS.